(12) United States Patent
Asano

(10) Patent No.: US 6,240,102 B1
(45) Date of Patent: May 29, 2001

(54) SYSTEM FOR ROUTING A UBR CONNECTION

(75) Inventor: Katsuhito Asano, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/039,594

(22) Filed: Mar. 16, 1998

(30) Foreign Application Priority Data

Mar. 17, 1997 (JP) ...................................... 9-062823

(51) Int. Cl.⁷ ........................................................ H04J 3/22
(52) U.S. Cl. ........................ 370/468; 370/323; 370/391; 370/395
(58) Field of Search ..................................... 370/230, 231, 370/232, 235, 389, 391, 392, 395, 396, 397, 398, 399, 465, 468

(56) References Cited

U.S. PATENT DOCUMENTS

| | | | | |
|---|---|---|---|---|
| 5,675,576 | * | 10/1997 | Kalampoukas et al. | 370/232 |
| 5,742,594 | * | 4/1998 | Natarajan | 370/336 |
| 5,812,527 | * | 9/1998 | Kline et al. | 370/232 |
| 5,889,779 | * | 3/1999 | Lincoln | 370/398 |
| 5,898,669 | * | 4/1999 | Shimony et al. | 370/232 |
| 5,940,396 | * | 8/1999 | Rochberger | 370/408 |
| 5,982,748 | * | 11/1999 | Yin et al. | 370/232 |
| 6,041,038 | * | 3/2000 | Aimoto | 370/229 |

FOREIGN PATENT DOCUMENTS 738571  2/1995  (JP).

* cited by examiner

Primary Examiner—Ajit Patel
Assistant Examiner—Bob A. Phunkulh
(74) Attorney, Agent, or Firm—Helfgott & Karas, P.C.

(57) ABSTRACT

An exchange constituting an ATM network administers the number of UBR connections for every line port included in the exchange. Upon receiving a request for setting a UBR connection, the exchange determines the route of the UBR connection on the basis of the number of the UBR connections administered for every line port included in the exchange.

8 Claims, 16 Drawing Sheets

| ROUTE DETERMINATION FACTOR | FEATURE OF UBR CONNECTION | USABILITY FOR ROUTE DETERMINATION |
|---|---|---|
| PHYSICAL CONDITION | | USABLE |
| ENSURING A REQUESTED BANDWIDTH | BANDWIDTH IS NOT ADMINISTERED | UNUSABLE |
| ENSURING A CONNECTION RESOURCE | | USABLE |
| ENSURING A REQUESTED QUALITY | A REQUEST FOR A TRANSMISSION QUALITY IS NOT MADE | UNUSABLE |

FIG. 1

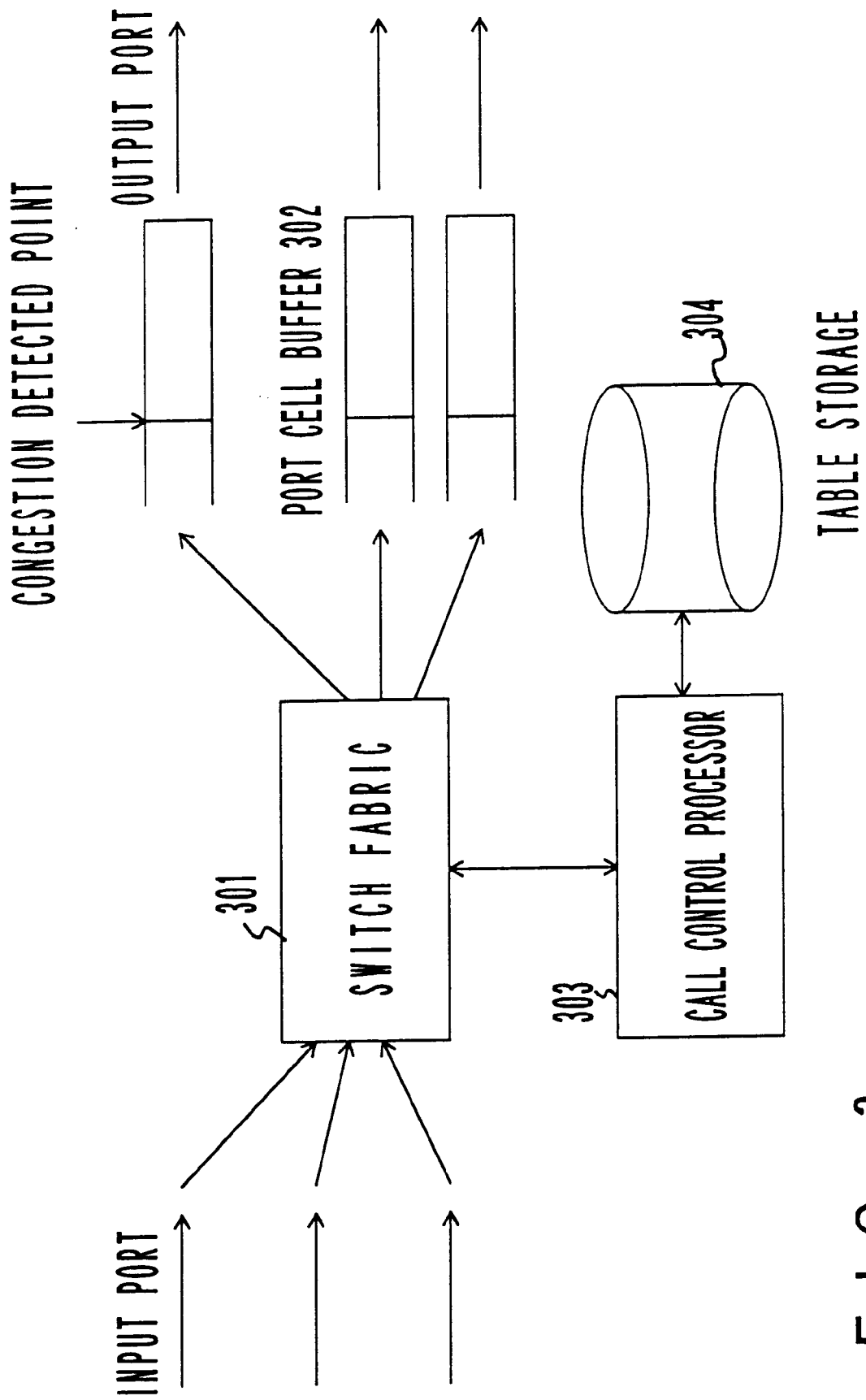
F I G. 3

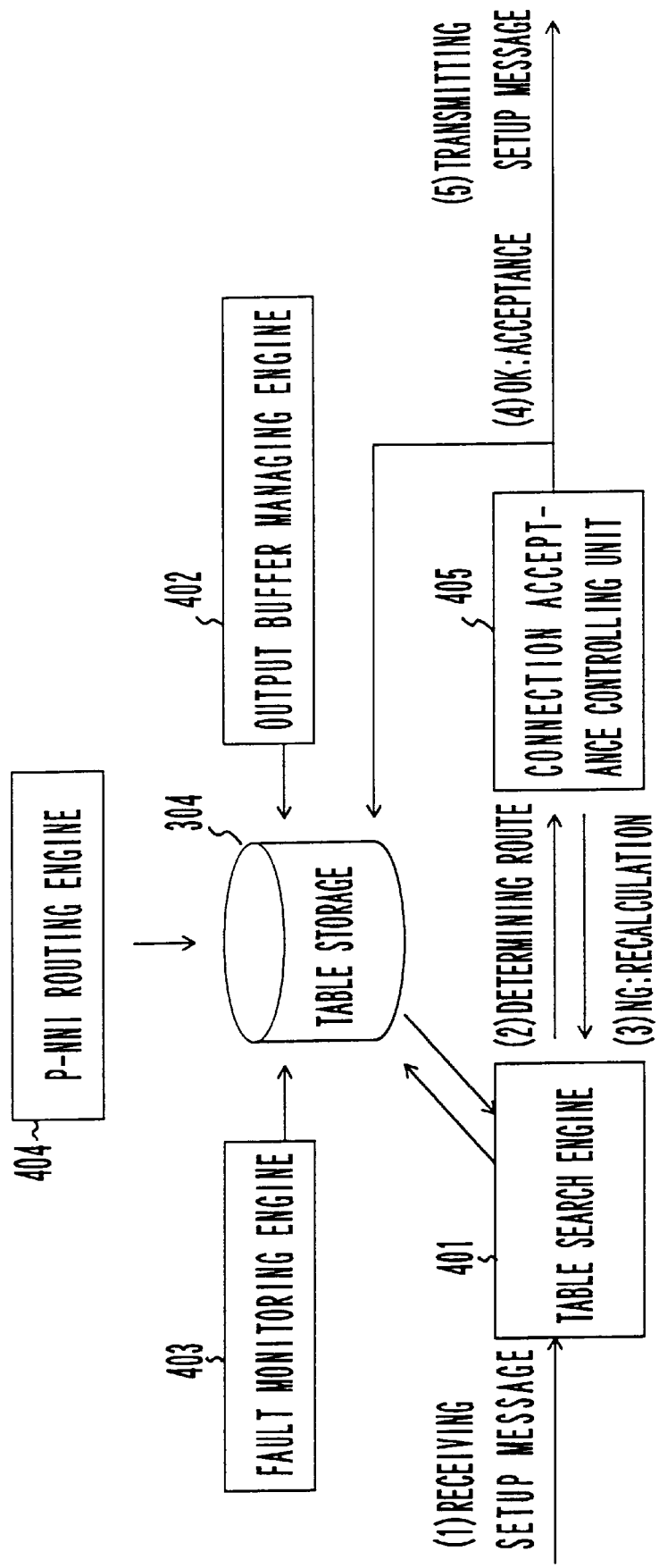
F I G. 4

ROUTING TABLE

| DESTINATION ADDRESS | VPGN |
|---|---|
| xxxxx... | 1 |
| yyyyyy... | 2 |

DETERMINING VPGN →

VPG TABLE

| VPGN | OUTPUT PORT | BANDWIDTH RESOURCE | CONNECTION COUNT(UBR) | PORT STATUS |
|---|---|---|---|---|
| 1 | 1 | aaaaa bps | 10 | ACTIVE |
| | 2 | bbbbb bps | 9 | ACTIVE |
| 2 | 3 | ccccc bps | 2 | ACTIVE |
| | 4 | ddddd bps | 1 | FAULT |
| | 5 | eeeee bps | 1 | ACTIVE |

DETERMINING OUTGOING PORT →

F I G. 5 A

F I G. 5 B

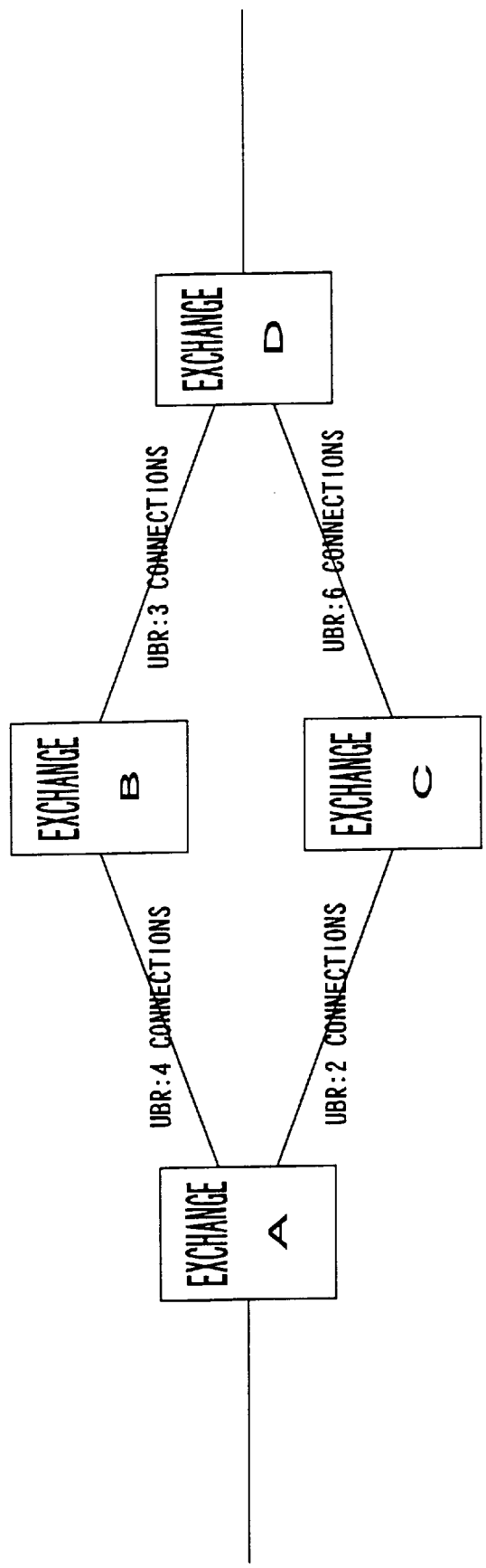
F I G. 9

| OUTGOING PORT | NUMBER OF ALREADY-SET UBR CONNECTIONS |
|---|---|
| #1 | 3 |
| #2 | 1 |
| #3 | 4 |
| #4 | 2 |

FIG. 10

| SETTING SECTION | NUMBER OF ALREADY-SET UBR CONNECTIONS (AW VALUE) ||
|---|---|---|
| | (a) ORDINARY CONDITION | (b) OCCURRENCE OF CONGESTION IN SECTION B-D |
| A-B | 4 | 4 |
| A-C | 2 | 2 |
| B-D | 3 | 100 (EXAMPLE) |
| C-D | 6 | 6 |

FIG. 11

PTSE Information Group
• Restricted Information Groups
  – Nodal state parameters IG
  – Nodal IG
  – Internal Reachable ATM Address IG
  – Exterior Reachable ATM Address IG
  – Horizontal Links IG
  – Uplinks IG
• Unrestricted Information Group
• Unknown Information Group

| 2 | Type | Type=288(Horizontal links) |
|---|---|---|
| 2 | Length | |
| 2 | Flags | |
| 22 | Remote Node ID | |
| 4 | Remote Port ID | |
| 4 | Local Port ID | |
| 1 | Aggregation Token | |
| . | ITERATION FOR THE NUMBER OF SERVICE CATEGORIES (Optional) Outgoing RAIG | |

FIG. 16

SYSTEM FOR ROUTING A UBR CONNECTION

BACKGROUND OF THE INVENTION

1. Field of the Invention

The present invention relates to techniques for routing a UBR (Unspecified Bit Rate) connection in an ATM (Asynchronous Transfer Mode) network.

2. Description of the Related Art

In recent years, the development of ATM networks has been promoted, and the principal purpose thereof consists in expediting existing LANs (Local Area Networks). In this regard, LAN data are transmitted through UBR connections within the ATM network in most cases. It is therefore conjectured that messages based on UBR connections will form a great majority of the traffic on an ATM network.

Accordingly, how to efficiently set the UBR connections becomes important when improving effective load distribution and utilization of resources, etc. in the ATM network.

The features of the UBR connection are as listed below:

(1) The UBR connection has the lowest quality among the four service categories of a CBR (Continuous Bit Rate) connection, a VBR (Variable Bit Rate) connection, an ABR (Available Bit Rate) connection and the UBR connection.

(2) The network does not guarantee a bandwidth requested by the user thereof.

(3) A request for a transmission quality is not be made by the user.

(4) On account of the above property (2), the network does not administer the bandwidths of the UBR connections.

In general, in determining a route for a connection, an ATM exchange checks the physical conditions (such as the occurrence of any fault) of communication lines including the route therein, it acquires a requested bandwidth on the route, it reserves connection resources on the route, and it secures a requested quality on the route. As indicated in FIG. 1, however, it is the actual situation of a UBR connection that only two factors; the check of the physical conditions of the lines including the UBR connection route therein, and the reservation of the connection resources on the route, are used for the determination of the route on account of the properties (1)–(4) of the UBR connection mentioned above.

For this reason, such UBR connections might be concentrated on a single route insofar as the physical conditions of the lines including the route therein are normal and as the connection resources on the route are still in surplus (that is, as the number of connections set on the route is smaller than the upper limit of connections).

Accordingly, the present-day system for routing a UBR connection has the problem that effective load distribution and utilization of resources cannot be improved in an ATM network.

SUMMARY OF THE INVENTION

The present invention has been made with the background stated above, and its object is to provide a system for routing a UBR connection to improve effective load distribution and utilization of resources in an ATM network.

The present invention is based on a system for routing an unspecified bit rate connection (UBR connection) wherein a route is determined by administering neither a bandwidth nor a quality in a cell network (ATM network) for communicating cells of fixed length (ATM cells) each of which is autonomously routed on the basis of route information set in a header part of the cell.

The first aspect of the performance of the present invention is configured as explained below.

An exchange constituting the cell network administers the number of unspecified bit rate connections for every resource included in the exchange.

Further, the exchange determines the route of the unspecified bit rate connection on the basis of the number of the unspecified bit rate connections administered for every resource included in the exchange.

As a result of the above configuration of the first aspect of the performance of the present invention, effective load distribution and utilization of the connection resources in the network are improved in the case of routing the unspecified bit rate connection in each resource of an ATM network system etc. which is based on a signaling protocol called the "IISP (Interim Inter-switch Signaling Protocol)" and approved by the ATM Forum.

The second aspect of the performance of the present invention is configured as explained below.

A constituent exchange of the cell network administers the number of unspecified bit rate connections for every resource included in the exchange.

Further, the constituent exchange possesses a database in which information on the numbers of unspecified bit rate connections of the respective resources included in all constituent exchanges of the cell network are stored in such a way that the constituent exchange and another constituent exchange of the cell network occasionally interchange the information on the numbers of unspecified bit rate connections of the respective resources included in both the exchanges and administered by both the exchanges.

Further, the constituent exchange of the cell network determines the route of the unspecified bit rate connection on the basis of the stored contents of the database possessed by this exchange.

As a result of the above configuration of the second aspect of the performance of the present invention, effective load distribution and utilization of the connection resources in the network are improved in the case of routing the unspecified bit rate connection in each resource of an ATM network system etc. which is based on a signaling protocol called the "P-NNI (Private-Network to Network Interface)" which is being standardized by the ATM Forum.

Each of the above configurations according to the present invention can be so configured that the number of the unspecified bit rate connections which use each resource or line port included in the exchange is set to a specific value indicative of congestion or a fault when the congestion or the fault has occurred in the resource or line port.

As a result, the selection of any route where the congestion or the fault currently occurs can be avoided in the case of routing the unspecified bit rate connection.

Brief Description of the Drawings

Other objects and features of the present invention will be readily understood by one skilled in the art from the description of the preferred embodiments of the invention when read in conjunction with the accompanying drawings, wherein:

FIG. 1 is a table for explaining the routing factors of a UBR connection;

FIG. 3 is a schematic diagram showing the configuration of each exchange;

FIG. 4 is a block diagram showing the functions of the first and second preferred embodiment;

FIGS. 5A and 5B are diagrams showing table formats in the first preferred embodiment;

FIG. 9 is a block diagram showing the system architecture of the second preferred embodiment;

FIG. 10 is a diagram showing the format of a table which indicates the numbers of already-set UBR connections, and which each exchange possesses in the second preferred embodiment;

FIG. 11 is a table showing metric information which each exchange stores in the second preferred embodiment;

FIG. 16 is a diagram showing the data structure of Horizontal Links IG (Information Group).

Description of the Preferred Embodiments

Now, the preferred embodiments of the present invention will be described in detail with reference to the drawings.

First Preferred Embodiment

Figure 2:
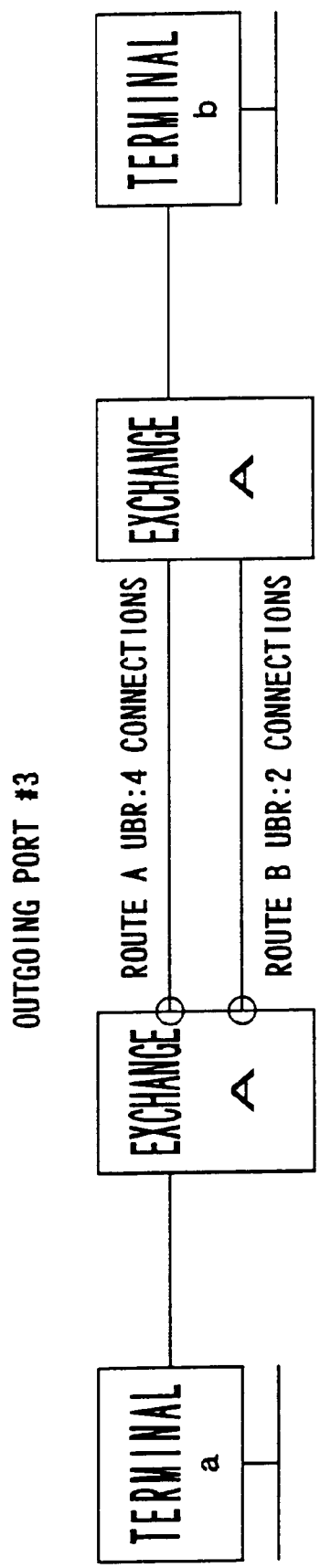
FIG. 2 is a block diagram showing the system architecture of the first preferred embodiment of the present invention.

FIG. 2 is a block diagram showing the system architecture of the first preferred embodiment of the present invention.

The first preferred embodiment is based on a network system wherein ATM exchanges (an exchange A and an exchange B in FIG. 2) constituting an ATM network cooperate to determine the route of a connection on the basis of a signaling protocol called the "IISP (Interim Inter-switch Signaling Protocol) and approved by the ATM Forum.

First, the IISP will be explained.

The IISP is such that UNI (User Network Interface) specifications 3.0/3.1, which are the specifications of the signaling protocol between a subscriber and a network and which have been approved by the ATM Forum, are directly adopted as the signaling protocol between exchanges.

With the IISP, the exchange constituting the network possesses an address prefix table in which the prefixes (address prefixes) of addresses reachable using an outgoing port included in the exchange are registered for every outgoing port.

Upon receiving a signaling request from a terminal accommodated in the exchange or from an exchange located at a preceding stage, the exchange collates a destination address contained in the signaling request with the address prefixes registered in the respective entries of the address prefix table which the exchange possesses. Thus, the exchange determines one of the outgoing ports corresponding to the entry which bears the most detailed one of the address prefixes contained in the destination address.

Subsequently, the exchange delivers a signaling request to the determined outgoing port in conformity with the signaling protocol based on the UNI specifications stated above.

Such operations are successively executed by the respective exchanges constituting the network, whereby the route between a source terminal and a destination terminal within the network is finally determined.

According to the IISP, the address prefix table possessed by each exchange constituting the network is manually set. In this sense, the IISP is a signaling protocol which statically routes a connection and which is suited to a small-scale network.

With the premise being that the network system utilizes the IISP as stated above, the first preferred embodiment of the present invention has it as a feature pertinent to the present invention that, as shown in FIG. 2, in the exchange constituting the network, the number of UBR connections already set in the outgoing port (the number of already-set UBR connections in the exchange is administered for every outgoing port (every route) in the exchange, so as to determine the route of the requested UBR connection by the use of the number of already-set UBR connections.

FIG. 3 is a schematic diagram showing the configuration of each exchange shown in FIG. 2.

An ATM cell input from an input port is switched by a switch fabric 301, and then output to each of output ports (outgoing ports) via each of port cell buffers 302.

These switching operations and a UBR process according to the present invention, which will be described later, are controlled by a call control processor 303. A table storage 304 referenced by the call control processor 303 stores a routing table and a VPG table, which will be described later.

FIG. 4 is a block diagram showing the configuration of the functions which are implemented by the call control processor 303 shown in FIG. 3, and are related to the present invention. These functions are implemented in such a way that the call control processor 303 executes each control program to be described later.

If an exchange receives a UBR connection setting request (signaling request of the UBR connection) as a SETUP message from a user, or if the exchange receives a UBR connection release request as a release message from a user, a table search engine 401 determines/releases the route of the UBR connection by referencing each of the tables in the table storage 304.

A connection acceptance controlling unit 405 transmits the SETUP message, etc. to the corresponding outgoing port based on the route determined/released by the table search engine 401, and updates the number of already-set UBRs in the VPG table in the table storage 304.

An output buffer managing engine 402 monitors the use rate of each of the port cell buffers 302 shown in FIG. 3. If the output buffer managing engine 402 detects a congested state in any of the port cell buffers, it reflects the state on the VPG table (to be described later) in the table storage 304.

A fault monitoring engine 403 monitors the state of each of the ports. If the fault monitoring engine 403 detects a fault state in any of the ports, it reflects the state on the VPG table (to be described later) in the table storage 304.

A P-NNI routing engine 404 which relates to the second preferred embodiment according to the present invention, interprets a P-NNI message which is exchanged between logical nodes, to be described later, and reflects the message on the tables generated in the table storage 304.

FIGS. 5A and 5B illustrate examples of the formats of a routing table and a VPG (Virtual Path Group) table, respectively, forming the address prefix table which the table storage 304 in the exchange (for example, the exchange A in FIG. 2) constituting the ATM network possesses in the first preferred embodiment of the present invention.

First, a plurality of outgoing ports belonging to the exchange are grouped in a path group called the "outgoing virtual path group (outgoing VPG)" as a unit. It is the VPG table shown in FIG. 5B that indicates the correspondence between the outgoing ports and the outgoing VPGs.

Further, the exchange possesses the routing table shown in FIG. 5A in which the prefixes (address prefixes) of addresses reachable by use of the outgoing VPGs are registered for the respective outgoing VPG (VPGN).

The VPG table stores a corresponding outgoing port (output port) for each VPGN (VPG number) corresponding to each outgoing VPG.

Further, as a feature especially pertinent to the present invention, the number of UBR connections already set in the outgoing port (the number of already-set UBR connections: connection count) is stored for every outgoing port in the VPG table shown in FIG. 5B.

Additionally, the bandwidth and port status of each of the ports are stored for each of the outgoing ports in the VGP table. Note that the bandwidth is used for controlling connections other than the UBR connection.

Figure 6:
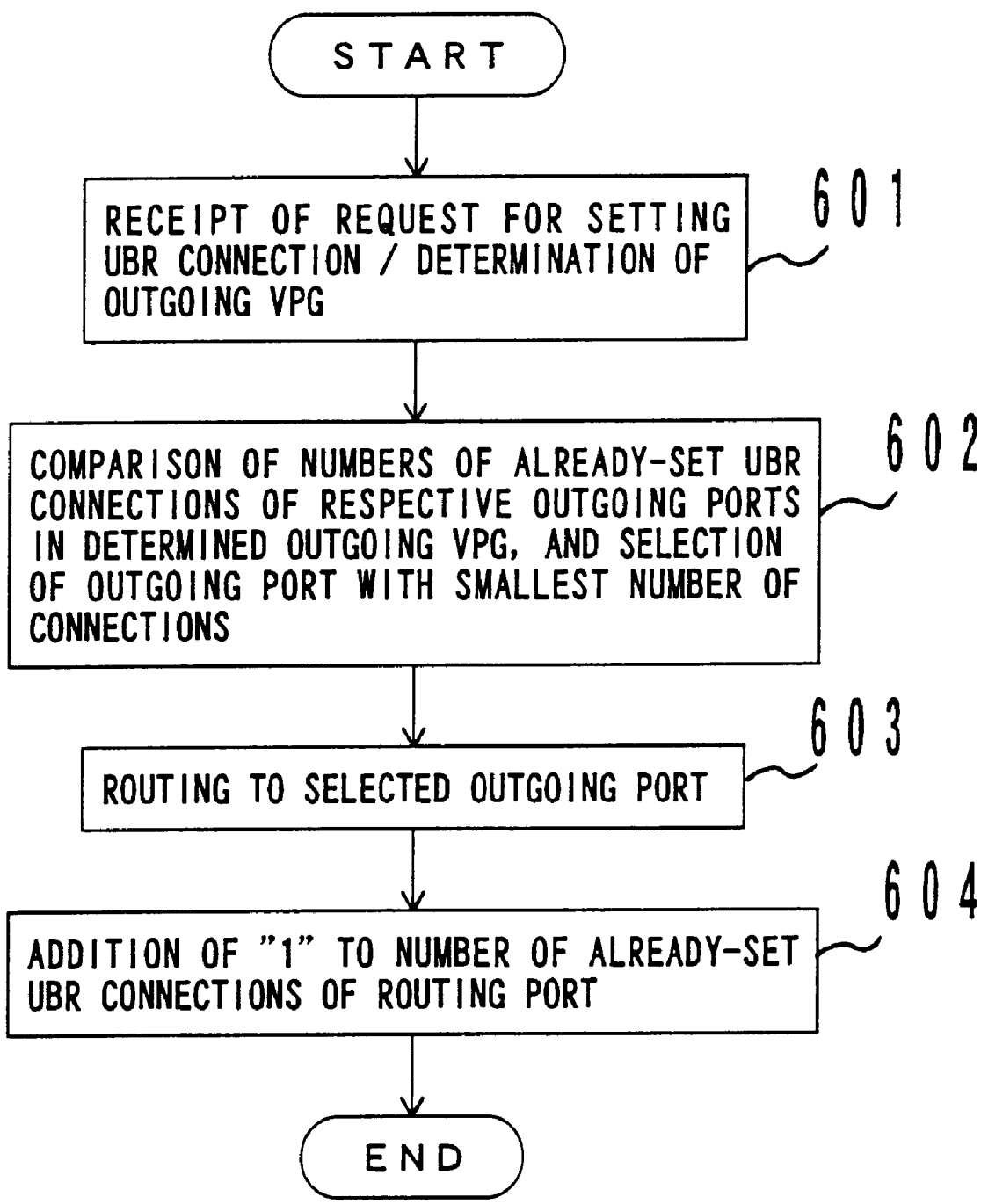
FIG. 6 is an operating flowchart in the case where a request for setting a UBR connection has been received in the first preferred embodiment.

FIG. 6 is an operating flowchart showing a control process which the exchange executes upon receiving a request for setting a UBR connection (a signaling request for a UBR connection), in the first preferred embodiment. The operating flowchart is realized as an operation in which a call control processor belonging to the exchange runs a control program stored in a storage medium also belonging to the exchange. More specifically, the operation in step 601 of FIG. 6 is implemented by the table search engine 401 of FIG. 4, while the operations in steps 602 through 604 are implemented by the connection acceptance controlling unit 405 of FIG. 4.

Upon receiving the UBR connection setting (establishing) request from a terminal accommodated in the exchange or from an exchange located at a preceding stage, not specifically shown in the figures, the table search engine 401 in the exchange collates a destination address contained in the request with the address prefixes registered in the respective entries of the routing table (refer to FIG. 5A) which the table storage 304 in the exchange possesses. Thus, the exchange determines the outgoing VPG (VPGN) corresponding to the entry which bears the most detailed one of the address prefixes contained in the destination address (step 601 in FIG. 6).

Referring to FIG. 2 by way of example, when the exchange A has received from a terminal a the UBR connection setting request in which the address "B. b" of a terminal b is set as the destination address, it collates the destination address "B. b" contained in the request with the address prefixes registered in the respective entries of the routing table shown in FIG. 5A as possessed by the exchange A. Thus, the exchange A determines the outgoing VPG "190 2" corresponding to the entry which bears the most detailed one "B" of the address prefixes contained in the destination address "B. b".

Subsequently, the above described table search engine 401 in the exchange selects the outgoing port to which the number of already-set UBR connections stored in the VPG table (refer to FIG. 5B) in correspondence with this outgoing port is the smallest among the outgoing ports registered in the entries of the determined outgoing VPG and to which the physical condition of a line corresponding to this outgoing port is normal (the port status of FIG. 5B is ACTIVE), from within the VPG table possessed by the table storage 304 in the exchange (step 602 in FIG. 6).

Referring to FIG. 2 by way of example, the exchange A selects the outgoing port "#4" to which the number of already-set UBR connections is the smaller between the outgoing ports "#3" and "#4" registered in the entries of the determined outgoing VPG "#2", from within the VPG table shown in FIG. 5B as possessed by the exchange A.

Subsequently, the above described connection acceptance controlling unit 405 in the exchange routes the UBR connection corresponding to the UBR connection setting request to the selected outgoing port (step 603 in FIG. 6). Concretely, VPI/VCI is reserved, the UBR connection setting request is delivered to the selected outgoing port, and so forth.

Referring to FIG. 2 by way of example, the exchange A executes a process for delivering the UBR connection setting request to the selected outgoing port "#4", and so on.

Lastly, the above described connection acceptance controlling unit 405 in the exchange adds "1" to the value of the number (connection count) of already-set UBR connections stored in correspondence with the selected outgoing port, within the VPG table (refer to FIG. 5B) possessed by the table storage 304 in the exchange (step 604 in FIG. 6).

Referring to FIG. 2 by way of example, the exchange A adds "1" to the value "2" of the number of already-set UBR connections (connection count) stored in correspondence with the selected outgoing port "#4", thereby to set a new value "3", within the VPG table shown in FIG. 5B as possessed by the exchange A.

Here, in a case where congestion or a fault has occurred in a certain outgoing port, this state is detected by the output buffer managing engine 402 or the fault monitoring engine 403, which are shown in FIG. 4, so that the number of already-set UBR connections corresponding to the certain outgoing port in the VPG table is set at the maximum settable value. As a result, the routing of the UBR connection to the certain outgoing port can be avoided. Thereafter, in a case where the congestion has been released or the fault has been recovered, the number of already-set UBR connections is restored to the original value. Moreover, in the case of a release of the congestion or a recovery of the fault, a time period for protection is provided, so that the routing to a line (or port) where congestion or a fault frequently occurs is avoided.

Figure 7:
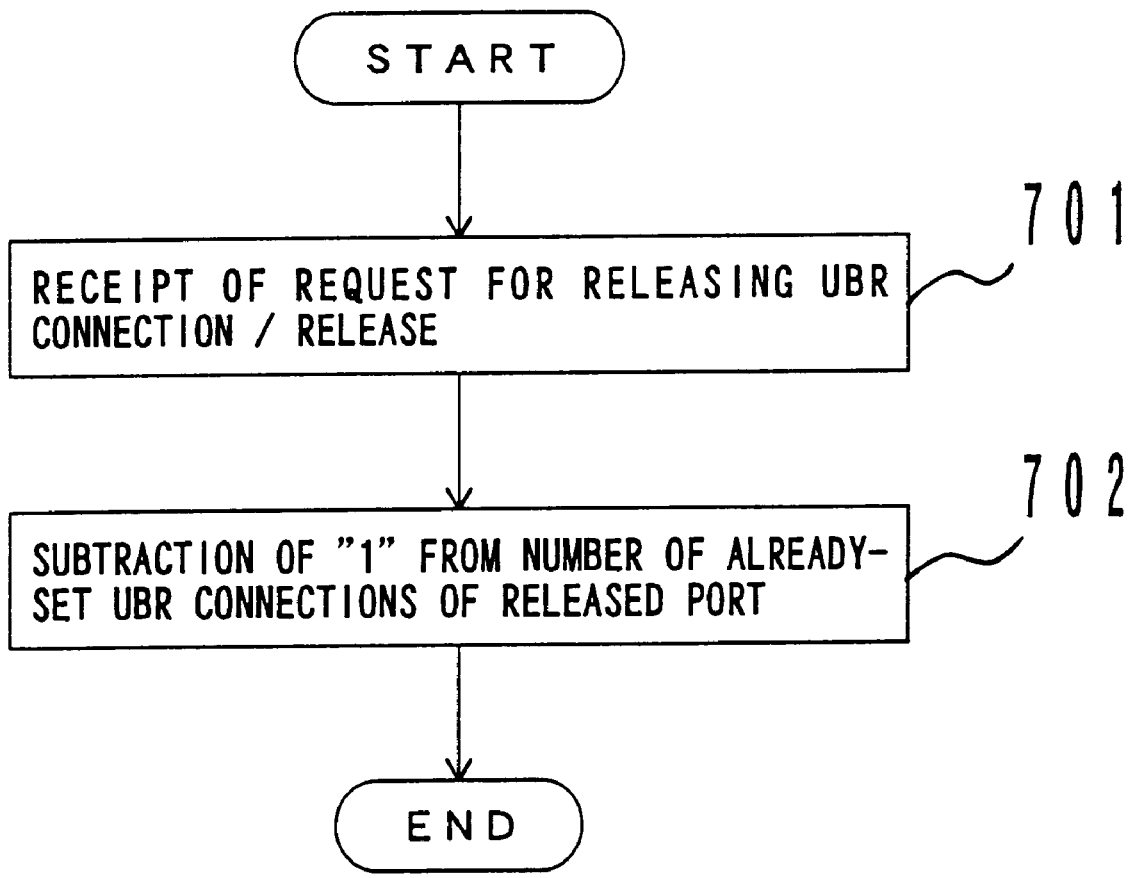
FIG. 7 is an operating flowchart in the case where a request for releasing the UBR connection has been received in the first preferred embodiment.

FIG. 7 is an operating flowchart showing a control process which the exchange executes upon receiving a request for releasing a UBR connection, in the first preferred embodiment. Likewise to the operating flowchart of FIG. 6, the operating flowchart of FIG. 7 is realized as an operation in which the call control processor belonging to the exchange runs a control program stored in the storage medium belonging to the exchange. More specifically, the operation in step 701 of FIG. 7 is implemented by the table search engine 401 of FIG. 4, while the operation in step 702 of FIG. 7 is implemented by the connection acceptance controlling unit 405 of FIG. 4.

Upon receiving the UBR connection releasing request from a terminal accommodated in the exchange or from an exchange located at a preceding stage, not specifically shown in the figures, the table search engine 401 in the exchange releases the UBR connection corresponding to the request (step 701 in FIG. 7). Concretely, the VPI/VCI is released, the UBR connection releasing request is delivered to the outgoing port to which the connection corresponding to the request belongs, and so forth.

Subsequently, the above described connection acceptance controlling unit 405 in the exchange subtracts "1" from the value of the number of already-set UBR connections stored in correspondence with the outgoing port to which the connection corresponding to the UBR connection releasing request belongs, within the VPG table (refer to FIG. 5B) possessed by the exchange (step 702 in FIG. 7).

As a result of the foregoing control processes respectively illustrated by the operating flowcharts of FIGS. 4 and 5, efficient load distribution and utilization of connection resources in the network are improved in the case of routing the UBR connection in the ATM network system which is based on the protocol IISP.

Second Preferred Embodiment

Next, the second preferred embodiment of the present invention will be described. The second preferred embodiment is based on a network system wherein ATM exchanges constituting an ATM network cooperate to determine the route of a connection on the basis of a signaling protocol called the "P-NNI (Private-Network to Network Interface)" which is being standardized by the ATM Forum.

First, the P-NNI will be explained.

Figure 8:
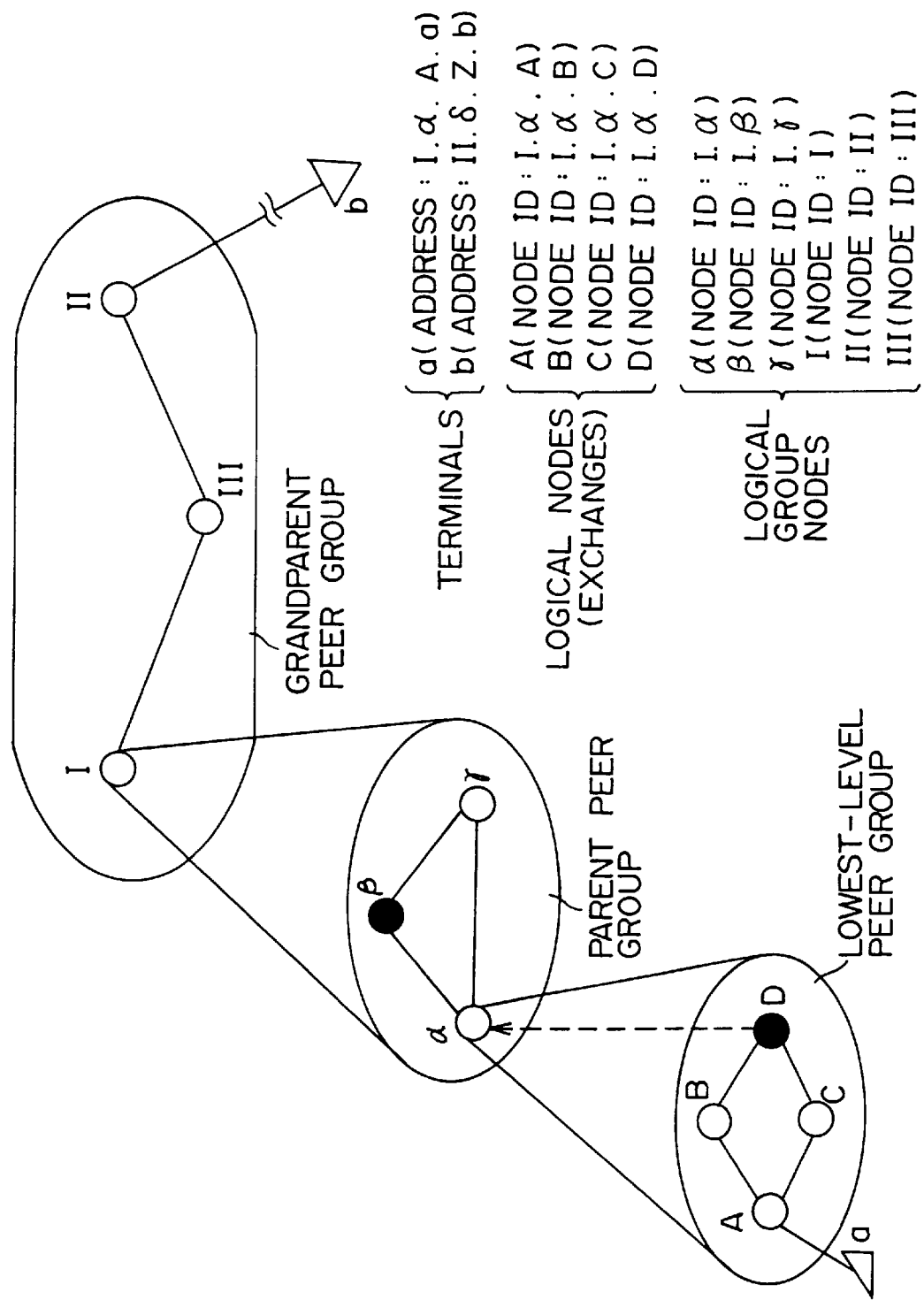
FIG. 8 is a diagram showing the structure of a P-NNI network in the second preferred embodiment of the present invention.

FIG. 8 is a diagram showing the structure of the P-NNI network on which the second preferred embodiment of the present invention is based.

With the P-NNI, a hierarchical network model as shown in FIG. 8 is defined.

First of all, a plurality of ATM exchanges constituting the network are grouped in conformity with certain criteria, for example, for individual company sections or for individual research laboratories. Groups formed as a result are called "peer groups". Especially, the peer group obtained by grouping actual exchanges becomes the lowest-level peer group in the hierarchy. The ATM exchanges constituting the lowest-level peer group are called "logical nodes", and the logical nodes are interconnected by appropriate logical links. The logical links correspond to interoffice lines for interconnecting the ATM exchanges.

In the example of FIG. 8, exchanges A, B, C and D are grouped, whereby one lowest-level peer group is formed.

Subsequently, several lowest-level peer groups gather, whereby the peer group whose network hierarchy is one level higher than the lowest-level peer group is formed. The peer group thus formed becomes a parent peer group to the lowest-level peer group, and it is obtained in units of, for example, branch offices. Each of the lowest-level peer groups which are respective elements constituting the parent peer group is represented by one logical node called a "logical group node". Further, within each lowest-level peer group, one logical node is selected as a special logical node called a "peer group leader", for realizing the function of the logical group node representative of the lowest-level peer group within the parent peer group to which this lowest-level peer group belongs.

In the example of FIG. 8, the logical group nodes α, β and γ which represent the lowest-level peer groups, respectively, are grouped, whereby one parent peer group is formed. Further, in the lowest-level peer group represented by the logical group node α, the logical node (exchange) D is selected as the peer group leader within the lowest-level peer group. In this case, various items of information which the logical group node α is to administer in the parent peer group are actually retained by the exchange D which is the peer group leader of the lowest-level peer group represented by the logical group node α.

Further, several parent peer groups gather, whereby the peer group whose network hierarchy is one level higher than the parent peer group is formed. The peer group thus formed becomes a grandparent peer group to the lowest-level peer group, and it is obtained in units of, for example, enterprise groups. Each of the parent peer groups which constitute the grandparent peer group is also represented by one logical group node. Besides, within each parent peer group, one logical node is selected as a peer group leader for realizing the function of the logical group node representative of the parent peer group within the grandparent peer group to which this parent peer group belongs.

In the example of FIG. 8, the logical group nodes I, II and III which represent the parent peer groups, respectively, are grouped, whereby one grandparent peer group is formed. Further, in the parent peer group represented by the logical group node I, the logical group node β is selected as the peer group leader within the parent peer group. In this case, various items of information which the logical group node I is to administer in the grandparent peer group are retained by the logical group node β which is the peer group leader of the parent peer group represented by the logical group node I, because the logical group node β is not a physical exchange. Finally, therefore, the various items of information which the logical group node I is to administer in the grandparent peer group are actually retained by an exchange, not specifically shown in the figures, which is the peer group leader of the lowest-level peer group represented by the logical group node β.

The number of the levels of the above described network hierarchy is not restricted to three, but a larger number of levels are allowed.

Here, each of the logical nodes constituting the peer groups of the respective network hierarchy levels possesses a database which can completely express the topology for determining the routes of connections within the peer group. In addition, the logical nodes mutually interchange the databases respectively possessed, every fixed time interval or with a predetermined trigger, and the synchronism of the databases respectively possessed is perfectly established between the logical nodes. However, the logical nodes constituting one peer group need not understand the topology in any other peer group.

Now, by way of example, a case will be considered where, in the network system shown in FIG. 8, a connection is to be established between a terminal a installed in the section A of the branch office α of the enterprise I and a terminal b installed in the section Z of the branch office δ of the enterprise II. In this case, the exchange A possesses the database which can completely express the topology concerning the interconnections among the exchanges A, B, C and D installed in the branch office a being the lowest-level peer group of this exchange A itself. The exchange A, however, possesses only a database with necessary and sufficient data, concerning the network of a higher hierarchical level among the branch offices of the enterprise I and the network of a still higher hierarchical level among the enterprise groups. That is, regarding the connection between the enterprise I to which the exchange A belongs and another enterprise, the exchange A knows only the fact that such a connection may be established via the branch office β. Besides, regarding the connection between the enterprise I to which the exchange A belongs and the enterprise II, the exchange A knows only the fact that such a connection may be established via the enterprise III.

In consequence, the source exchange A determines the following list as a list which indicates the route of the connection from the terminal a in the section A of the branch office α of the enterprise I, to the terminal b in the section Z of the branch office δ of the enterprise II:

[I.α.A-I.α.B-I.α.D][I.α-I.β][I-III-II]-II.δ.Z.b

Such a list is called a "DTL (Designated Transit List)".

Next, the exchange A sends the exchange B a connection setting request in which the DTL is stored. As a result, within the lowest-level peer group to which the exchange A belongs, the connection setting request is transferred to the exchange D on the basis of the complete route information [I.α.A-I.α.B-I.α.D] contained in the DTL stored in the request. Thus, a route corresponding to the connection within the lowest-level peer group to which the exchange A belongs is determined.

Subsequently, when the connection setting request has arrived at the exchange D which is the peer group leader of the lowest-level peer group corresponding to the logical group node α included in the parent peer group, the exchange D generates the complete route information in the parent peer group, on the basis of summed-up route information [I.α-I.β] contained in the DTL included in the connection setting request. Thereafter, the exchange D sends a connection setting request in which the generated complete route information is affixed to the DTL, to the exchange which corresponds to the logical group node constituting the parent peer group. As a result, a route for the connection corresponding to the connection setting request within the parent peer group is determined.

A similar control process is executed as to the grandparent peer group.

In the network system which uses the P-NNI so far explained, each exchange may completely determine only the topology within the peer group to which the exchange belongs, and it need not determine the topology within any different peer group or any peer group of a different hierarchical level. For this reason, the P-NNI has the features that a large-scale ATM network can be coped with, and that the amount of routing information to be communicated in the network can be sharply decreased.

With the premise being that the network system utilizes the P-NNI stated above, the second preferred embodiment of the present invention has a configuration as described below.

Since the second preferred embodiment of the present invention is based on the network system utilizing the P-NNI, the exchanges corresponding to the logical nodes included in each of the peer groups constituting the network interchange address prefixes which are reachable within the particular peer group and route information items which indicate complete routes corresponding to the address prefixes within the particular peer group. In addition, the exchanges corresponding to the peer group leaders of the respective peer groups interchange address prefixes which are reachable beyond the peer groups and route information items which indicate the summed-up routes corresponding to the address prefixes among the peer groups. In consequence, although no special illustration is made, the exchanges which correspond to the logical nodes in each of the peer groups constituting the network possess dynamic address prefix tables which are the databases on the route information perfectly synchronized between each peer group, and they select candidates for the routes of UBR connections on the basis of these tables. Incidentally, the physical conditions of the logical links between the logical nodes (the normal states of the lines) are also reflected in the databases. Since the above functions have already been realized in the network system utilizing the P-NNI, the details thereof shall be omitted.

Next, in the second preferred embodiment of the present invention, as illustrated in FIG. 9, the number of UBR connections already set in the outgoing port (the number of already-set UBR connections) included in the exchange is administered for every outgoing port (every route) in each of the exchanges corresponding to the logical nodes included in each of the peer groups constituting the network, and information items on the numbers of already-set UBR connections are interchanged between the exchanges corresponding to the logical nodes included in the identical peer group. Accordingly, all the exchanges (exchanges A, B, C and D in FIG. 9) corresponding to all the logical nodes included in the identical peer group come to possess a common database concerning all the numbers of already-set UBR connections within the peer group to which they belong. Thus, in the second preferred embodiment of the present invention, each exchange determines the route of the optimum UBR connection from among the candidates for the route for a UBR connection selected on the basis of the above mentioned dynamic address prefix table, in accordance with the information items on all the numbers of already-set UBR connections within the peer group to which the exchange belongs. This is a feature pertinent to the present invention.

FIG. 10 is a diagram exemplifying the format of a table which lists the numbers of already-set UBR connections, and which each exchange possesses in the second preferred embodiment of the present invention.

In the table, the number of UBR connections already set in the outgoing port (the number of already-set UBR connections) is stored for every outgoing port.

Next, FIG. 11 illustrates the contents of the database concerning all the numbers of already-set UBR connections within the identical peer group to which all the exchanges (the exchanges A, B, C and D in FIG. 9) corresponding to all the logical nodes belong, the database being possessed in common by all the exchanges. The information items indicated by the database are called "metric information".

More specifically, by way of example, the database contains, in correspondence with the configuration of a peer group shown in FIG. 9, the metric information items indicative of the numbers of the UBR connections which are already set on the interoffice lines of all the logical links within the peer group, that is, between the exchanges A and B, between those A and C, between those B and D and between those C and D.

In this case, the exchanges corresponding to the logical nodes (or logical group nodes) within the identical peer group interchange the set contents of the table (refer to FIG. 10) which lists the numbers of already-set UBR connections and which the respective exchanges possess, every fixed time interval or with a predetermined trigger, by the use of AW (Administrative Weight) values set in packets called "PTSP", to be explained later, as is stipulated in the P-NNI specifications, and the synchronism of the databases (refer to FIG. 11) respectively possessed is perfectly established between the logical nodes. These control operations are performed by the P-NNI routing engine 404 shown in FIG. 4.

Here, in the database, the numbers of already-set UBR connections as shown in column (a) in FIG. 11, by way of example, are set in an ordinary condition. On the other hand, when the occurrence of congestion or a fault on the interoffice line between, for example, the exchanges B and D has been detected by the exchange B or the exchange D, the exchange B or D sets the maximum settable value as the number of already-set UBR connections corresponding to the interoffice line between the exchanges B and D, and it notifies the other exchanges of the information on the number of already-set UBR connections. Thus, in the database, as indicated in column (b) in FIG. 11, by way of example, the number of already-set UBR connections corresponding to the interoffice line between the exchanges B and D is set at a very large value (100 as shown in column (b) in FIG. 11). As a result, each exchange can recognize that the congestion or the fault has occurred on the interoffice line between the exchanges B and D, and it can avoid the routing of a new UBR connection to the congested line. By the way, in a case where the congestion has been released or the fault has been recovered, the number of already-set UBR connections is restored to the original value. Moreover, in the case of the release of the congestion or the recovery of the fault, a time period for protection is provided, so that the routing to a line (or port) where congestion or a fault frequently occurs is avoided.

Figure 12:
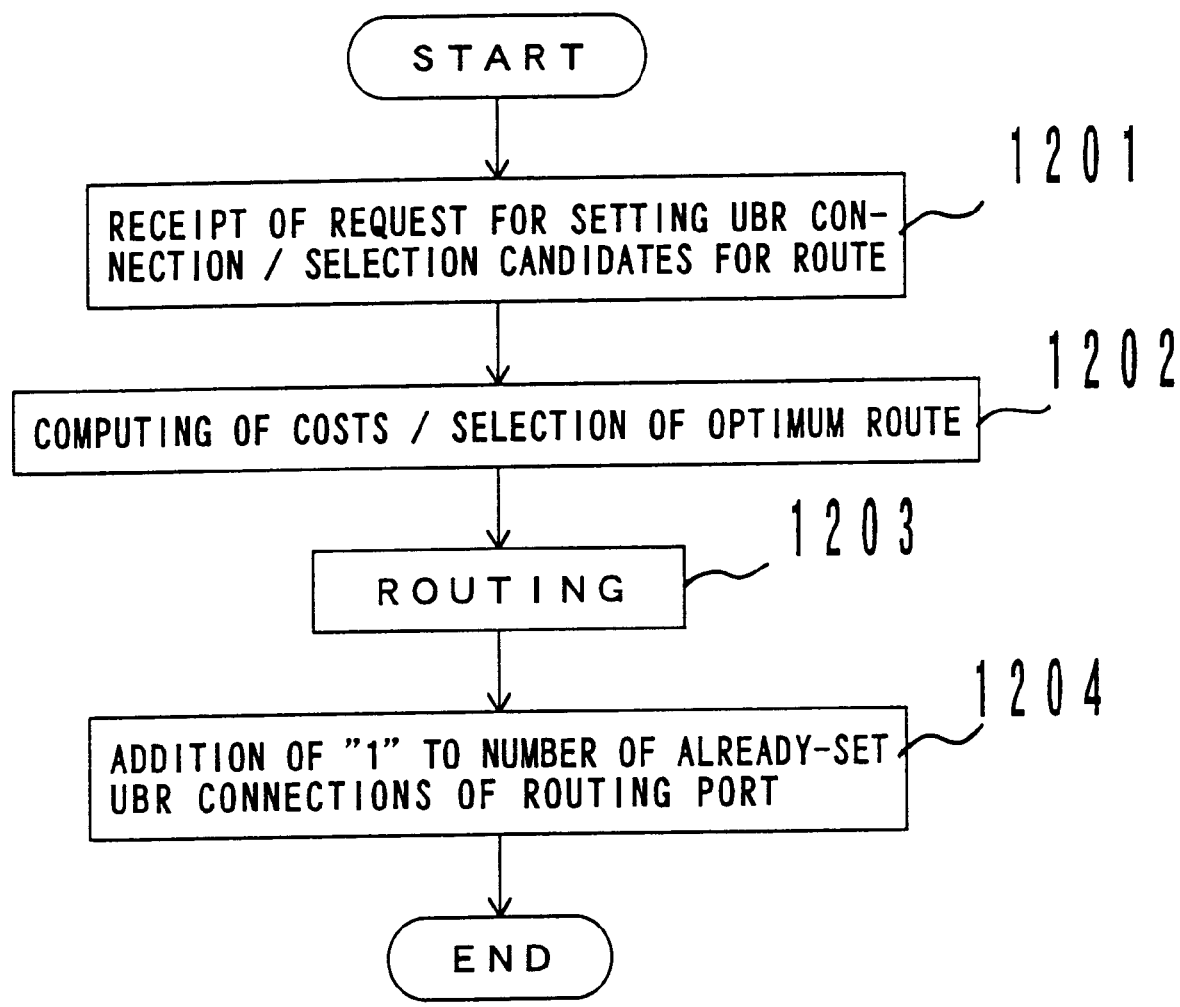
FIG. 12 is an operating flowchart in the case where a request for setting a UBR connection has been received in the second preferred embodiment.

FIG. 12 is an operating flowchart showing a control process which the exchange executes upon receiving a request for setting a UBR connection (a signaling request for a UBR connection), in the second preferred embodiment. The operating flowchart is realized as an operation in which a call control processor belonging to the exchange runs a control program stored in a storage medium also belonging to the exchange. More specifically, the operations in steps 1201 and 1202 of FIG. 12 are implemented by the table search engine 401 of FIG. 4, while the operations in steps 1203 and 1204 are implemented by the connection acceptance controlling unit 405 of FIG. 4.

Upon receiving the UBR connection setting request from a terminal accommodated in the exchange or from an exchange located at a preceding stage not specifically shown in the figures, the table search engine 401 in the exchange collates a destination address contained in the request with the address prefixes registered in the respective entries of the above mentioned dynamic address prefix table (not specifically shown in the figures) which the table storage 304 in the exchange possesses. Thus, the exchange selects at least one candidate for a route corresponding to at least one entry which bears the address prefix contained in the destination address (step 1201 in FIG. 12).

Referring to FIG. 9, by way of example, the exchange A selects a route "A-B-D" and a route "A-C-D" as the candidates for the route whose destination address indicates a terminal accommodated in the exchange D.

Subsequently, the above described table search engine 401 in the exchange computes costs on the routes for the individual route candidates, and it selects the optimum route from the route candidates on the basis of the computed results (step 1202 in FIG. 12). As a concrete example, the table search engine 401 in the exchange acquires the numbers of already-set UBR connections on the respective logical links (interoffice lines) included in each route, from the database of the metric information (refer to FIG. 11) which the table storage 304 in the exchange possesses, and it computes the total value of the numbers of already-set UBR connections on the route. Subsequently, the exchange selects the route with the minimum total value as the optimum route from among the route candidates.

Figure 14:
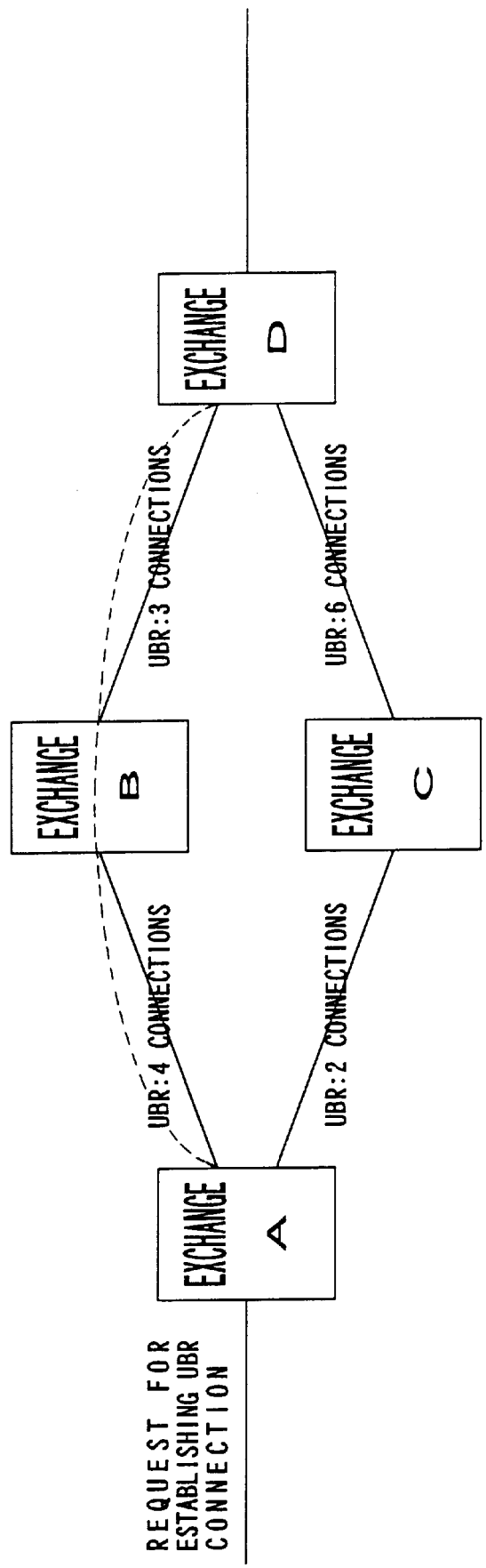
FIG. 14 is a block diagram for explaining the operation of the second preferred embodiment.

Referring to FIG. 9, by way of example, for one route "A-B-D" selected as the candidate, the exchange A acquires the numbers of already-set UBR connections, "4" and "3" on the respective logical links "A-B" and "B-D" respectively, included in the route, from the database of the metric information indicated in FIG. 11, and it calculates the total value "7" of these numbers. Likewise, for one route "A-C-D" selected as the candidate, the exchange A acquires the numbers of already-set UBR connections, "2" and "6" on the respective logical links "A-C" and "C-D" respectively, included in the route, from the database of the metric information indicated in FIG. 11, and it calculates the total value "8" of these numbers. In consequence, as shown in FIG. 14, the exchange A selects the route candidate "A-B-D" having the smaller total value as the optimum route, between the route candidates "A-B-D" and "A-C-D".

Subsequently, the above exchange routes the UBR connection corresponding to the UBR connection setting request, to an outgoing port included in the selected route (step 1203 in FIG. 12). Concretely, VPI/VCI is reserved, the UBR connection setting request is delivered to the selected outgoing port, and so forth.

Lastly, the above described connection acceptance controlling unit 405 in the exchange adds "1" to the value of the number of already-set UBR connections stored in correspondence with the selected outgoing port, within the table (refer to FIG. 10) which lists the numbers of already-set UBR connections and which is possessed by the table storage 304 in the exchange (step 1204 in FIG. 12).

In this case, the above exchange notifies the value of the new number of already-set UBR connections to the other exchanges every fixed time interval or with a predetermined trigger, by the use of the AW values set in the packets called "PTSP", to be explained later, as is stipulated in the P-NNI specifications. As a result, the synchronism of the databases of the metric information (refer to FIG. 11) respectively possessed is perfectly established among the exchanges.

Figure 13:
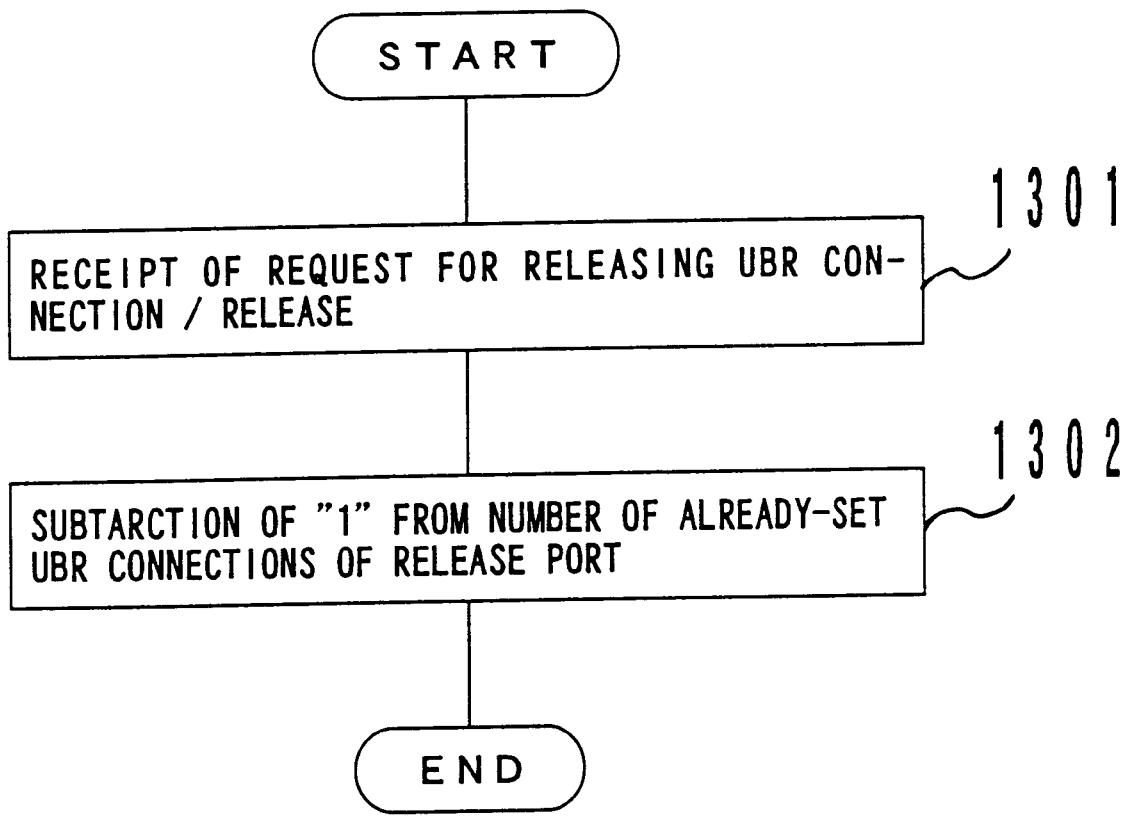
FIG. 13 is an operating flowchart in the case where a request for releasing the UBR connection has been received in the second preferred embodiment.

FIG. 13 is an operating flowchart showing a control process which the exchange executes upon receiving a request for releasing a UBR connection, in the second preferred embodiment. Similar to the operating flowchart of FIG. 12, the operating flowchart of FIG. 13 is realized as an operation in which the call control processor belonging to the exchange runs a control program stored in the storage medium belonging to the exchange. More specifically, the operation in step 1301 of FIG. 13 is implemented by the table search engine 401 of FIG. 4, while the operation in step 1302 of FIG. 13 is implemented by the connection acceptance controlling unit 405 of FIG. 4.

Upon receiving the UBR connection releasing request from a terminal accommodated in the exchange or from an exchange located at a preceding stage, not specifically shown in the figures, the table search engine 401 in the exchange releases the UBR connection corresponding to the request (step 1301 in FIG. 13). Concretely, the VPI/VCI is released, the UBR connection releasing request is delivered to the outgoing port to which the connection corresponding to the request belongs, and so forth.

Subsequently, the above described connection acceptance controlling unit 405 in the exchange subtracts "1" from the value of the number of already-set UBR connections stored in correspondence with the outgoing port to which the connection corresponding to the UBR connection releasing request belongs, within the table (refer to FIG. 10) which lists the numbers of already-set UBR connections and which is possessed by the table storage 304 in the exchange (step 1302 in FIG. 13).

In this case, the above exchange notifies the value of the new number of already-set UBR connections to the other exchanges every fixed time interval or with a predetermined trigger, by the use of the AW values set in the packets called "PTSP", to be explained later, as is stipulated in the P-NNI specifications. As a result, the synchronism of the databases of the metric information (refer to FIG. 11) respectively possessed is perfectly established among the exchanges.

Owing to the foregoing control processes respectively illustrated by the operating flowcharts of FIGS. 12 and 13, efficient load distribution and utilization of connection resources in the network are improved in case of routing the UBR connection in the ATM network system which is based on the protocol specified in P-NNI.

Figure 15:
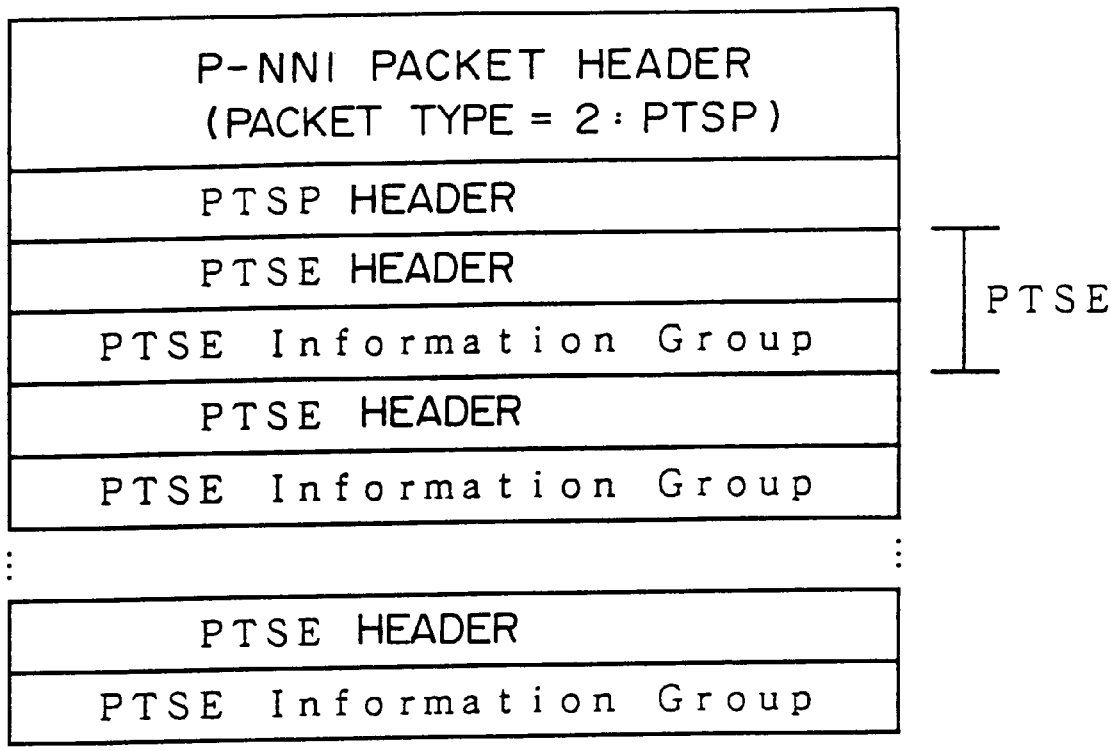
FIG. 15 is a diagram showing the data structure of PTSP.

FIGS. 15 and 16 are diagrams for explaining the data structure of the packet called "PTSP" which is used in order that the exchanges corresponding to the respective logical nodes (or logical group nodes) within the identical peer group may interchange the set contents of the table (refer to FIG. 10) which lists the numbers of already-set UBR connections and which is possessed by the respective exchanges. The set content of the table mentioned above is given as the administrative weight value AW in a field "Outgoing RAIG" (FIG. 16) within an element "Horizontal Links IG" which is set in each field "PTSE Information Group" (FIG. 15) contained in the PTSP.

The AW value has 100 values per UBR connection, and it is computed in conformity with the following formula and is set in the PTSP:

$$AW\text{ value}=\text{Initial }AW\text{ value}+(\text{Number of already-set UBR connections})\times 100$$

Accordingly, each exchange possesses the database of the AW values as the database of the metric information corresponding to FIG. 11.

The packet PTSP is transferred between the exchanges by the use of an ATM cell on a virtual channel having a predetermined VPI/VCI value or a predetermined VPI value.

What is claimed is:

1. A method of routing an unspecified bit rate connection wherein a route is determined by administering neither a bandwidth nor a quality in a packet network for communicating packets of fixed length, each of which is autonomously routed on the basis of route information set in a header part of the packet, comprising the steps of:

allowing a constituent switching system of the packet network to administer the number of unspecified bit rate connections for every resource included in the switching system; and allowing said switching system to determine the route of the unspecified bit rate connection on the basis of the number of the unspecified bit rate connections administered for every resource included in said switching system.

2. A method as defined in claim 1, wherein said number of said unspecified bit rate connections which use each resource or line port included in said switching system is set at a specific value indicative of congestion or a fault when the congestion or the fault has occurred in the resource or line port.

3. An apparatus for routing an unspecified bit rate connection wherein a route is determined by administering neither a bandwidth nor a quality in a packet network for communicating packets of fixed length, each of which is autonomously routed on the basis of route information set in a header part of the packet, comprising:

number-of-connections storage means installed in a constituent switching system of the packet network, for storing therein the number of unspecified bit rate connections for every line port included in the switching system; and routing means installed in the constituent switching system of said cell network, for operating at an occurrence of a connection setting request to determine the route of the unspecified bit rate connection correspondent to the connection setting request and also to update the stored content of said number-of-connections storage means, on the basis of said stored content of said number-of-connections storage means installed in said switching system.

4. An apparatus as defined in claim 3, wherein said number of the unspecified bit rate connections which use each resource or line port included in said switching system is set at a specific value indicative of congestion or a fault when the congestion or the fault has occurred in the resource or line port.

5. A method of routing an unspecified bit rate connection wherein a route is determined by administering neither a bandwidth nor a quality in a packet network for communicating packets of fixed length, each of which is autonomously routed on the basis of route information set in a header part of the packet, comprising the steps of:

allowing a constituent switching system of the packet network to administer the number of unspecified bit rate connections for every resource included in the switching system;

allowing the constituent switching system of said packet network to possess a database in which information on the numbers of unspecified bit rate connections of the respective resources included in all constituent switching systems of said packet network are stored in such a way that said constituent switching system and another constituent switching system of said packet network interchange on occasion the information on the numbers of unspecified bit rate connections of the respective resources included in both the switching systems and administered by both said switching systems; and allowing said constituent switching system of said packet network to determine the route of the unspecified bit rate connection on the basis of the stored contents of the database possessed by said switching system.

6. A method as defined in claim 5, wherein said number of said unspecified bit rate connections which use each resource or line port included in said switching system is set at a specific value indicative of congestion or a fault when the congestion or the fault has occurred in the resource or line port.

7. An apparatus for routing an unspecified bit rate connection wherein a route is determined by administering neither a bandwidth nor a quality in a packet network for communicating packets of fixed length, each of which is autonomously routed on the basis of route information set in a header part of the packet, comprising:

number-of-connections storage means installed in a constituent switching system of the packet network, for storing therein the number of unspecified bit rate connections for every line port included in the switching system;

database means installed in the constituent switching system of said packet network and built in such a way that said constituent and another constituent switching system of said packet network interchange on occasion information on the numbers of unspecified bit rate connections of the respective resources included in both the switching systems and administered by both said switching systems, for storing therein the information on the numbers of unspecified bit rate connections of the respective resources included in all constituent switching systems of said packet network; and routing means installed in said constituent switching system of said packet network, for operating at an occurrence of a connection setting request to determine the route of the unspecified bit rate connection correspondent to the connection setting request and also to update the stored content of said number-of-connections storage means, on the basis of said stored content of said number-of-connections storage means installed in said switching system, the updated information being notified to the other constituent switching system of said packet network.

8. An apparatus as defined in claim 7, wherein said number of the unspecified bit rate connections which use each resource or line port included in said switching system is set at a specific value indicative of congestion or a fault when the congestion or the fault has occurred in the resource or line port.

* * * * *